July 3, 1956

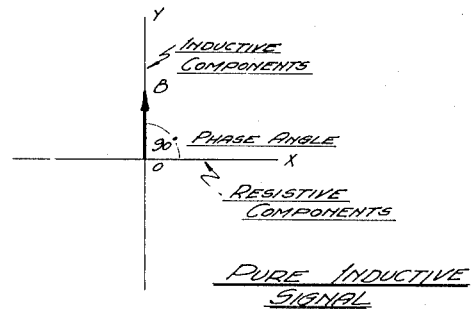
FIG. 2·A
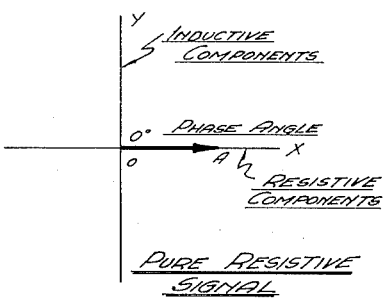
FIG. 2·B
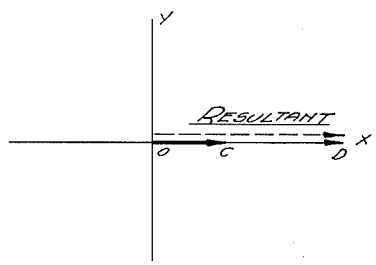
FIG. 2·C
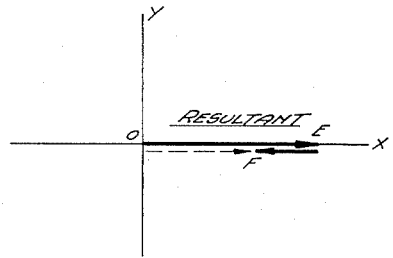
FIG. 2·D
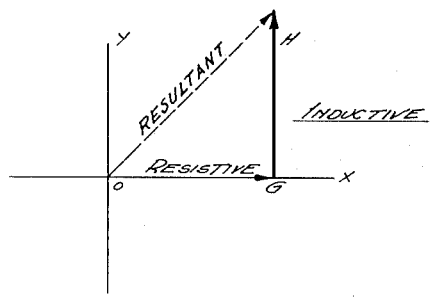
FIG. 2·E
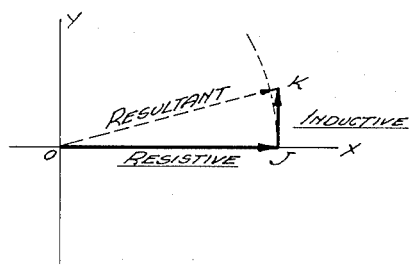
FIG. 2·F

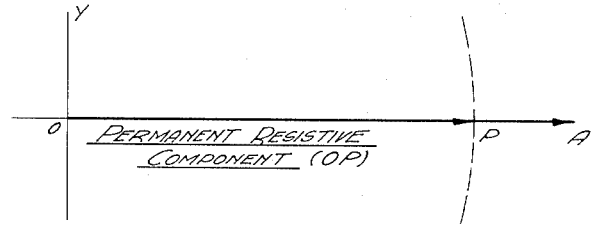
FIG. 3·A.
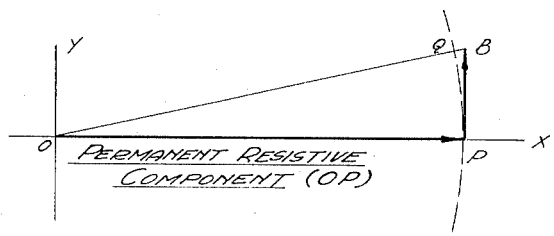
FIG. 3·B
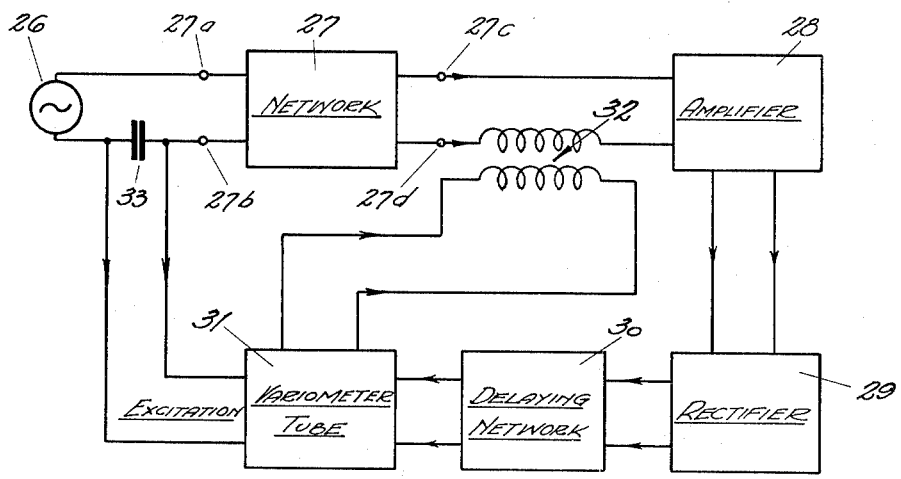
FIG. 4.

HENRI-GEORGES DOLL 2,753,520

METHODS AND SYSTEMS FOR MAINTAINING ALTERNATING CURRENT
NETWORKS IN A REFERENCE CONDITION

Filed March 23, 1946

Inventor
Henri-Georges Doll
By Hoguet, Neary & Campbell
Attorneys

United States Patent Office 2,753,520
Patented July 3, 1956

2,753,520

METHODS AND SYSTEMS FOR MAINTAINING ALTERNATING CURRENT NETWORKS IN A REFERENCE CONDITION

Henri-Georges Doll, Houston, Tex., assignor, by mesne assignments, to Schlumberger Well Surveying Corporation, Houston, Tex., a corporation of Delaware Application March 23, 1946, Serial No. 656,574

17 Claims. (Cl. 324—6)

This invention relates to methods of, and systems for, rendering alternating current networks phase selective and, therefore, insensitive to components in quadrature to the selected phase. It relates further to systems for automatically maintaining such networks, or a part thereof, in a reference condition.

In four-terminal networks, current is supplied to the two input terminals and indications or an output are obtained at or across the other two terminals.

An alternating current bridge is a typical form of four-terminal network in which changes in the characteristics of components of the bridge are reflected in the output of the bridge. These bridges are outgrowths or developments of the Wheatstone bridge which has been used heretofore to determine unknown quantities by balancing the bridge initially, inserting the unknown, and rebalancing by means of calibrated standards or by inserting an unknown and observing a deflection of a suitable meter which has been calibrated to indicate quantities in accordance with the amount of unbalance of the bridge.

Alternating current networks based upon the principles of the alternating current bridge, and particularly mutual impedance bridges, have been used for such purposes as the detection of land mines and the detection of metal in lumber and other materials. These prior bridges have not been entirely satisfactory for the reason that they must be sensitive, and, for that reason, are difficult to maintain in proper balance. Under laboratory conditions, it is reasonably easy to maintain such bridges in a balanced condition, inasmuch as the various factors which tend to create bridge unbalance are not subject to wide variations and can be controlled. However, under the conditions of commercial or military usage, quite different conditions exist. The devices are subjected to wide variations in humidity, temperature, to rain and shock, and as a result, the electrical characteristics and, in particular, the mutual inductance tends to vary and render the bridge unbalanced. Such unbalanced conditions usually can be corrected by provision of suitable manually operated adjusting devices, but in unskilled hands, errors may occur which render the indications obtained with the system undependable. Moreover, the time required for rebalancing the bridge manually is undesirable in military operations. In many cases, the bridges used in mine detection had to be rebalanced about every two minutes, requiring about one minute to rebalance the bridge.

In such devices as land mine detectors, the tendency of the bridge circuit to become unbalanced is greatly emphasized for the reason that the detectors must be used under all sorts of climatic conditions, and the opportunity for exact adjustment of the detecting bridge network is, at best, limited. Moreover, the prior systems used in mine detection have been sensitive primarily to metallic bodies rather than nonmetallic bodies, and, therefore, they are not useful in detecting the nonmetallic type of mine or for that matter any other nonmetallic substance.

The sensitivity of the bridge can be increased to such an extent that it might be possible to detect nonmetallic mines buried in conductive ground, but if its sensitivity were increased to this extent, its rate of drift would be increased so greatly that it would require rebalancing every few seconds, which is prohibitive.

An object of the present invention is to provide a detector system which has sensitivity to conditions or objects providing a signal of one phase and which discriminates strongly against objects or conditions providing a signal of a different phase.

Another object of the invention is to provide means for maintaining a four-terminal alternating current network in a reference condition of predetermined magnitude and phase.

A further object of the invention is to provide alternating current networks which are capable of automatically compensating for drifts in the magnitude and/or phase of currents in the network.

A still further object of the invention is to provide means for impressing an unbalance of predetermined phase and magnitude on a system to render the system phase-sensitive.

Another object of the invention is to provide four-terminal networks which are automatically stabilized to a predetermined signal level in order to eliminate amplitude drift.

Another object of the invention is to compensate for any phase drift automatically and continuously.

A still further object of this invention is to provide systems whereby the phase and magnitude of a voltage or current in an alternating current network can be effectively controlled.

Other objects of the invention will become apparent from the following description of typical forms of systems embodying the present invention.

The foregoing phase selective objects have been attained by providing four-terminal alternating current networks in the output of which an unbalancing component, generally either resistive or inductive, is introduced to provide a permanent unbalance, level or reference value which renders the network more sensitive to factors tending to unbalance the output in the same phase, and less sensitive to effects tending to unbalance the output in a phase in quadrature with the phase of the introduced component. By controlling the phase of the unbalance, it is possible to locate metallic objects while discriminating strongly against spurious effects produced, for example, by salt water or magnetic ground.

The terms "resistive" and "inductive" as used herein have the following meaning.

An electromotive force such as appears in the output from a four-terminal network will be referred to as "inductive" if its phase with respect to the energizing input current is either 90° or 270°.

Similarly, an output electromotive force will be referred to as "resistive" if its phase with respect to the input current is either 0° or 180°.

The above definitions where chosen because they conform to the action in mutual impedance bridges such as will be described hereinafter. If, for example, a purely inductive material, such as powdered iron, is brought into the magnetic field of such mutual impedance bridge, it produces a signal of the inductive phase. Since this electromotive force is produced by an inductive material, it is convenient to refer to this as the "inductive" component of the signal.

In the same way, if a purely resistive medium is introduced into the magnetic field, it produces a signal of the "resistive" phase.

In general, it may be said that, at the frequencies generally used, most metal objects give both inductive and resistive components which are of the same order of magnitude so that either one can be used for detection. Most of the other materials which provide spurious effects give signals having only one of the two components; for example, sea water gives signals that are substantially purely resistive, while magnetic ground gives a substantially purely inductive signal. Thus, in accordance with the present invention, by introducing a resistive component into the network, it is possible to discriminate against the effect of materials giving inductive signals such as magnetic ground and thereby permit the location of mines in such ground by detection of the resistive component of their signals. Conversely, it is possible to discriminate against the resistive signal of sea water and detect mines in such water by the inductive component of their signals.

Further, in accordance with the invention, four-terminal networks are provided with means for returning the system to a substantially constant reference value or level of unbalance to compensate for drifts. Preferably, the automatic balancing system is arranged to have a delayed action so that sudden variations of the magnitude of a signal such as those obtained when passing over a mine can be indicated in the output of the system. Such automatic balancing of the system is particularly desirable in case of vehicular-mounted detectors which have to operate continuously for a long period and the efficiency of which would be greatly reduced if the vehicle had to be stopped every few minutes for rebalancing. Vehicles equipped with such an automatic system can be operated for as long as a day or even longer without requiring an adjustment, whereas earlier models had to be rebalanced every few minutes. Similarly, with detectors of very high sensitivity used for nonmetallic mine detection, the drifts become so fast that field detection is impossible, unless the detectors include automatic balancing systems of the type embodying the present invention.

Moreover, in accordance with the invention, the system may be arranged to nullify automatically any unbalance in quadrature with the phase selected for permanently unbalancing the system. Inasmuch as such quadrature unbalance is unimportant from a detection or signalling standpoint, usually the automatic balancing system therefor will not purposely be delayed, but instead will be arranged to nullify as quickly as practical the effects of such quadrature unbalance.

Systems of the type described generally above are useful for many different purposes such as, for example, in the detection of land mines, the inspection of materials formed of electrically nonconductive materials such as wood which might contain metallic objects or vice versa, detection of mines in salt water or other objects in conductive or magnetic media. Moreover, it may be used in order to overcome changing relationships between the elements of delicately balanced electrical systems wherein the characteristics of the system tend to be altered continuously by climatic or other conditions.

For a better understanding of the present invention, reference may be had to the accompanying drawings in which:

Figures 2A to 2F are vector diagrams showing vector additions and combinations;

Figures 3A and 3B are diagrams illustrating vectorially the use of a permanent signal or unbalance to make an electrical indicator phase-selective.

Figures 4 and 5 are circuit diagrams of typical devices embodying the invention including means for automatically balancing the circuit;

While the invention will be illustrated primarily in connection with a mutual impedance bridge as typical of a four-terminal network, it will be understood that the invention has many other applications.

Figure 1:
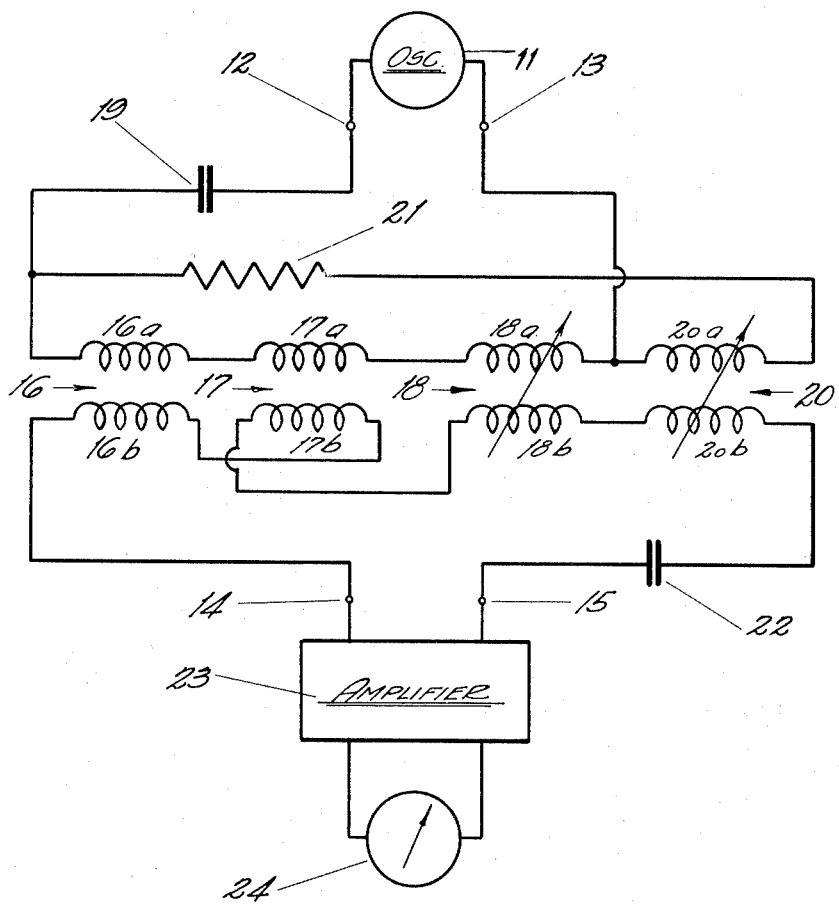
Figure 1 is a schematic circuit diagram of a mutual impedance bridge provided with means for manually compensating for drift.

An example of such a four-terminal network is the arrangement disclosed in Figure 1 which is a form of mutual impedance bridge that may be used for detecting metallic or nonmetallic objects. The device includes an oscillator 11 which supplies energy to the terminals 12 and 13 of a network having four terminals 12, 13, 14, and 15.

The oscillator 11 is connected in series with the primary 16a of a detecting coil 16, the primary 17a of a bucking air core transformer 17, the primary 18a of variometer 18 and a tuning condenser 19. The primary 20a of a second variometer 20 is connected in series with a resistance 21 across the primaries 16a, 17a, and 18a. The secondary 16b of the detector coil 16 is connected in series with a secondary 17b of the transformer 17, the secondary 18b of the variometer 18, the secondary 20b of the variometer 20 and a tuning condenser 22 and to the input of an amplifier 23. The output of the amplifier 23 is fed to voltmeter 24 or other indicating device.

The coils 17a and 17b may constitute a closely coupled air core transformer which is situated at a sufficient distance from the coils 16a and 16b to prevent any appreciable interaction between their magnetic fields.

Physically the transformer 17 may be positioned in the center of the coils 16a and 16b, the axes of the two sets of coils being perpendicular.

For convenience, the circuit including the oscillator 11 will be referred to as the "transmitter" circuit and the circuit including the coils 16b, 17b, 18b, and 20b will be referred to as the "receiver" circuit.

In the transmitter circuit, the oscillator 11 causes current to flow through the primary coils 16a, 17a, 18a, and 20a, each of which induces a corresponding electromotive force in the secondaries 16b, 17b, 18b and 20b, in the receiver circuit.

In order for any alternating current bridge to be perfectly balanced, it is necessary that it be balanced for both amplitude and phase. The variometers 18 and 20 are included in the circuit for this purpose.

Inasmuch as the primary 18a of the variometer 18 is in series with a primary 16a and 17a, current of the same phase passes through these three primaries. The electromotive force induced in the secondary 18b of the variometer 18, therefore, is in phase with the electromotive forces induced in the secondaries 16b and 17b. The variometer 18, therefore, may be used to adjust the inductive component in the receiver circuit.

The primary 20a of the variometer 20 is in series with the relatively high resistance 21 across the inductive part of the transmitter circuit. Because of the presence of the resistance 21 and because the coils 16a and 17a have a reactance much larger than their resistance, the current through the primary 20a is nearly 90° ahead of current flowing through the primaries 16a, 17a and 18a. The electromotive force induced in the secondary 20b of the variometer 20, therefore, is nearly 90° ahead of the electromotive force induced in the variometer secondary 18b. The variometer 20, therefore, may be used to adjust the resistive component of the signal. Combined operation of the variometers 18 and 20 permits balancing the bridge in amplitude and phase.

While the variometers 18 and 20 have been used heretofore to balance the bridge to zero, in accordance with this invention, they are preferably used to adjust the magnitude and phase of a permanent bridge signal. Thus, if it is desired to detect metallic articles in salt water, for example, a permanent inductive component or unbalance of suitable magnitude would be introduced into the receiver circuit and adjusted by means of the variometer 18.

The variometer 20 is used to balance out any resistive component that may be present.

Conversely, if it is desired to detect metallic materials in magnetic ground, a permanent resistive component or unbalance of suitable magnitude would be introduced into the receiver circuit and adjusted by means of the variometer 20, while the variometer 18 is used to balance out any residual inductive component that may be present.

This feature will be better understood by reference to Figures 2A to 2F and 3A and 3B of the drawings.

Figures 2A to 2F show various components and combinations of signal electromotive forces for purely inductive signals, purely resistive signals and combinations of the two. If the signal vectors are plotted in a system of rectangular coordinates, with the resistive components plotted along the OX axis and the inductive components plotted along the OY axis, a purely inductive signal or the inductive component of a signal, such as OB will be plotted along the OY axis, as shown in Figure 2A. A purely resistive signal OA will lie along the OX axis as shown in 2B.

When two inductive signals are impressed simultaneously in the receiving circuit, they add their effect if they both have a phase of 90° or if they both have a phase of 270° with respect to the OX axis. One vector subtracts from the other if the phase of one is 90° and the phase of the other is 270°.

Similarly, the resistive component vectors OC and CD in Figure 2C have the same phase so that the resultant of the two is OD. Figure 2D shows the combination of two similar resistive components of opposite phase. Thus, if OE having a phase of 0° is combined with vector EF having a phase of 180°, the resultant is OF.

When an inductive component and a resistive component are applied simultaneously to the receiving circuit, they combine as rectangular vectors as shown in Figures 2E and 2F. As shown in Figure 2E if a resistive signal OG is combined with an inductive signal GH of equal magnitude, the resultant OH has a phase of 45° and a magnitude 1.4 times as large as either of the component vectors. When one of the component factors is appreciably larger than the other, for example, the resistive component OJ of Figure 2F combines with a substantially smaller inductive component JK, the resultant component OK has about the same magnitude as the component OJ. For example, if the inductive component JK is one-fifth as large as the resistive component OJ, then the magnitude of the resultant OK is only 2% larger than the larger component OJ. If the magnitude of the vector OJ is ten times larger than the magnitude of the vector JK, then the resultant vector OK is only one-half percent larger than the vector OJ.

If a conventional system were used to locate metallic mines, for example, in a magnetic ground, a large number of false signals would result. In order to discriminate against these unwanted signals without impairing the resistive signals due to the mines, the detector may be made much more sensitive to the resistive than to the inductive components. To accomplish this, a strong signal of the resistive phase is maintained in the receiver circuit. This resistive signal may be represented by the vector OP in Figure 3A. The amplifier 23 or the meter 24 in Figure 1 would then be biased by an amount almost corresponding to the permanent signal OP so that when a signal of magnitude OP is flowing in the receiver circuit, there will be only a small deflection on the meter 24. If a metallic mine is encountered, it will cause an additional resistive signal PA (Figure 3A) to flow in the receiver circuit. The composite signal would then be represented by the vector OA. The amplifier and detector are so arranged that they respond only to the magnitude of the resultant signal. Thus, when the signal is increased from OP to OA, a change in the deflection corresponding to the vector PA is noted on the meter.

If the detector is brought close to magnetic ground which causes an inductive signal PB (Figure 3B) to appear in the receiver circuit, the resultant vector OB has very nearly the same magnitude as the permanent signal OP and the meter 24 would then be deflected only by a small amount corresponding to BQ. The signal change is so small, so long as the permanent signal is large, that the deflection of the meter 24 would be negligible.

In the same way, the detector can be made highly discriminative against resistive signals, while remaining sensitive to inductive signals, by introducing a permanent signal that is purely inductive.

In the circuit described above, or in any alternating current network of general or special application, it may be desired to maintain the circuit in a reference condition. In the embodiment of the invention described, it is convenient to maintain the bridge unbalanced to the selected degree, or to maintain a permanent unbalance or level.

Figure 5:
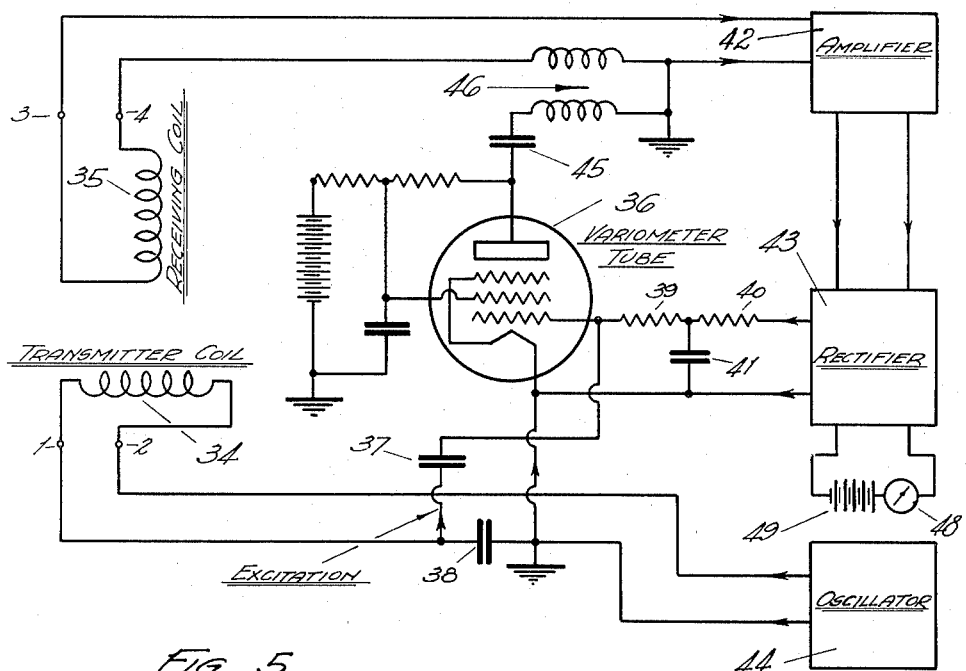

Circuits for accomplishing this result are shown schematically in Figures 4 and 5.

Referring to Figure 4, an oscillator or other source of alternating current 26 supplies energy through a series tuning condenser 33 to input terminals 27a and 27b of a network 27. The output terminals 27c and 27d of network 27 are connected through one winding of a transformer 32 to an amplifier 28. The output of amplifier 28 is rectified and filtered by rectifier 29. The output of rectifier 29 passes through a delaying network 30 to a variometer tube 31 which maintains the magnitude of the permanent signal constant. The variometer tube 31 is excited by the voltage appearing across condenser 33. The output of variometer tube 31 is fed back into the network output by means of transformer 32 or in any other suitable way.

In operation, the output of oscillator 26, and hence the current input to the network 27 is maintained constant. When something is altered in the network 27, for instance, when an electric circuit constant may be changed, or the coupling between parts is altered, the output signal appearing at terminals 27c and 27d changes. The change in signal may be either an increase or a decrease, depending upon the conditions. The change may be in magnitude, in phase, or both.

When the network 27 is at its standard or reference status, a signal is fed to amplifier 28, rectifier 29, delaying network 30 and the variometer tube 31, which introduces a permanent signal of given phase into the output circuit of the network. The action of the tube 31 is such that conditions will be stable at this point. When any condition or conditions are changed in network 27, the magnitude or phase or both of the signals appearing at terminals, change. If, for example, the signal suddenly increases, the increased signal will be fed to amplifier 28, rectifier 29, and through delaying network 30, to the tube 31. The action of the tube 31 is such that it then decreases the amount of permanent signal it has been introducing into the amplifier circuit. Due to the presence of delaying network 30, the compensation is not instantaneous, but has any characteristic delay required. The compensation is progressive, following an exponential law and it may take a few seconds, for example, for the bridge to be rebalanced. The action of the system, and particularly the action of the automatic variometer tube will become more evident from the following description of Figure 5.

Referring to Figure 5, the four-terminal network may comprise a mutual impedance bridge having a primary or transmitter coil 34 and a secondary or receiving coil 35. In this bridge the two coils may be mounted at right angles so that normally no voltage is induced in the receiving coil 35. The transmitter coil 34 is energized by an oscillator 44, the transmitter circuit being tuned to series resonance by a condenser 38. The receiving coil 35 is connected to an amplifier 42, the output of which is rectified by rectifier 43. The output of rectifier 43 is applied through a bucking bias battery 49 to a potential indicating meter 48. The direct current output of rectifier 43 also passes through a conventional resistance-capacitance delaying network which may comprise, for example, resistors 39 and 40 and a shunt condenser 41. After passing through this delaying network, the direct current potential is applied to the control grid of variometer tube 36 which may be, for example, a variable $\mu$ pentode. The control grid of tube 36 is also excited by the alternating E. M. F. appearing across the condenser 38, the D. C. being blocked by condenser 37. The remainder of the connections to the tube 36 are conventional. The plate of tube 36 is connected through a blocking condenser 45 to the primary winding of a transformer 46, the secondary of which is connected between one end of the coil 35 and the amplifier 42.

In operation, the oscillator 44 energizes the transmitter coil 34, the circuit being tuned by condenser 38. The A. C. voltage appearing across condenser 38 is applied through the blocking condenser 37 to the control grid of tube 36; thus, the output of tube 36 is modulated in accordance with the alternating voltage appearing across the condenser 38. The D. C. bias on the control grid controls the amplification of the tube. The variometer tube 36, therefore, always has an A. C. output which is fed through a blocking condenser and the transformer 46 to the input of the amplifier 42. The reactance of the condenser 45 is small and can be neglected; the self-impedance of the primary winding of the transformer 46 is small compared with the resistance which it sees in looking toward the tube 36; while the input impedance of the amplifier 42 is high compared with the impedances in its input circuit. The phase of the E. M. F. applied to the input of the amplifier is then at 90° or 270° with respect to the current flowing in the transmitter circuit. The action of tube 36 is, therefore, to insert an inductive component of signal voltage in the receiver circuit, the magnitude of this added signal being controlled by the D. C. bias applied to the control grid. The action of the variometer tube 36 is similar to the action of the conventional variometer 18 or 20 of Figure 1; hence the name "variometer tube" or "electronic variometer." It differs from the ordinary variometer in that instead of requiring manual control, it may be controlled by varying its D. C. bias and hence may be rendered automatic. The axes of transmitter coil 34 and receiving coil 35 are perpendicular so no E. M. F. normally is induced in the receiving coil due to current flowing in the transmitter coil. In this instance, for example, when no mine is detected, the only E. M. F. appearing in the receiver circuit is the inductive component induced by pentode 36.

The bias voltage supplied by battery or other suitable means 49 is adjusted so that a given deflection, such as half-scale, for example, to a false zero position is present on the meter 48 when no mine is present.

When a metallic mine is detected, for example, or when a signal is induced in receiver coil 35 as a result of the current flowing in transmitter coil 34, the input to amplifier 42 is altered. For the purpose of illustration, the signal produced by the detection of the mine may be considered to be in phase with the permanent signal produced by the tube 36. Accordingly, the input to amplifier 42 is increased suddenly and the output of rectifier 43 increases. When the output of rectifier 43 increases, due to the signal produced by the mine, a corresponding deflection will be noted on the meter 48. The output of rectifier 43 is also fed through the delaying network to the control grid of tube 36 so that the D. C. bias on the control grid gradually becomes more negative, which in turn, decreases the amplification of tube 36 which reduces the magnitude of the inductive signal being introduced into the receiver circuit. The action continues until the total signal strength is approximately equal to the original permanent signal and the meter has returned to its original indication.

The action of the delaying network is purposely slow and may require a few seconds to restore the network to its reference condition. The reason for this delay is to permit signals produced by a mine to be observed.

Ordinarily, the coils 34 and 35 are swept parallel with the surface of the earth so that when they pass over a mine, a momentary signal is produced.

On the other hand, drifts that occur are gradual, normally, and the slow action of rebalancing or restoring the system is sufficient to compensate for these drifts without production of an observable signal.

In most cases, an apparatus incorporating the above salient features is sufficient. The only case not completely controlled and compensated for is the one where a network is subject to a large drift, the phase of which is in quadrature to the phase of the wanted signal, that is, the permanent signal.

A typical example of this case is the detection of metallic and nonmetallic mines in magnetic ground. The magnetic ground introduces an inductive signal and also temperature changes cause a change in the relation of the coils which causes an inductive drift. It is, therefore, desirable to detect the mines by their resistive signal and discriminate against inductive signals or drifts.

Figure 6:
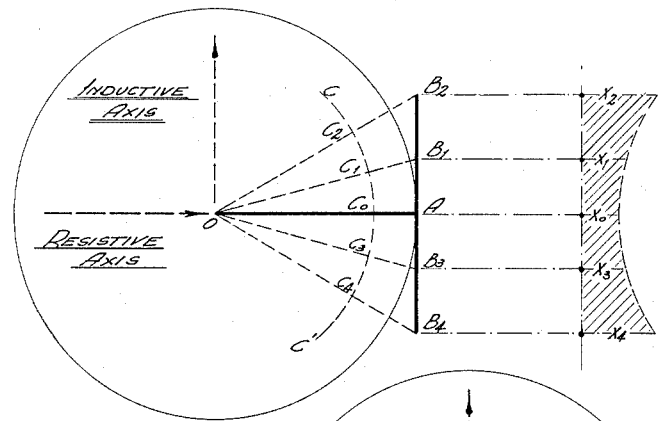
Figures 6 and 7 are diagrammatic illustrations of the principle relied upon for automatically balancing drifts in quadrature to the phase of the selected component.
Figure 7:
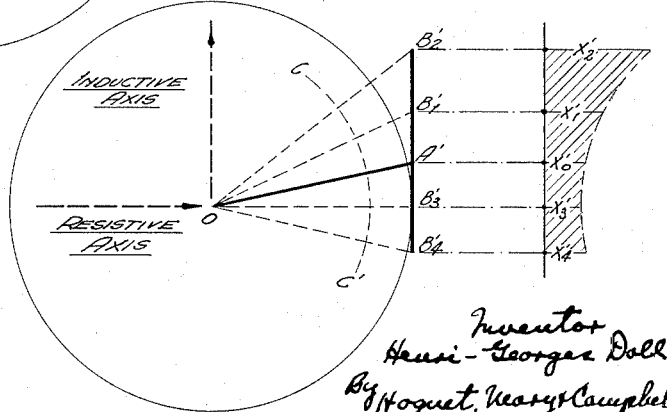
Figure 8:
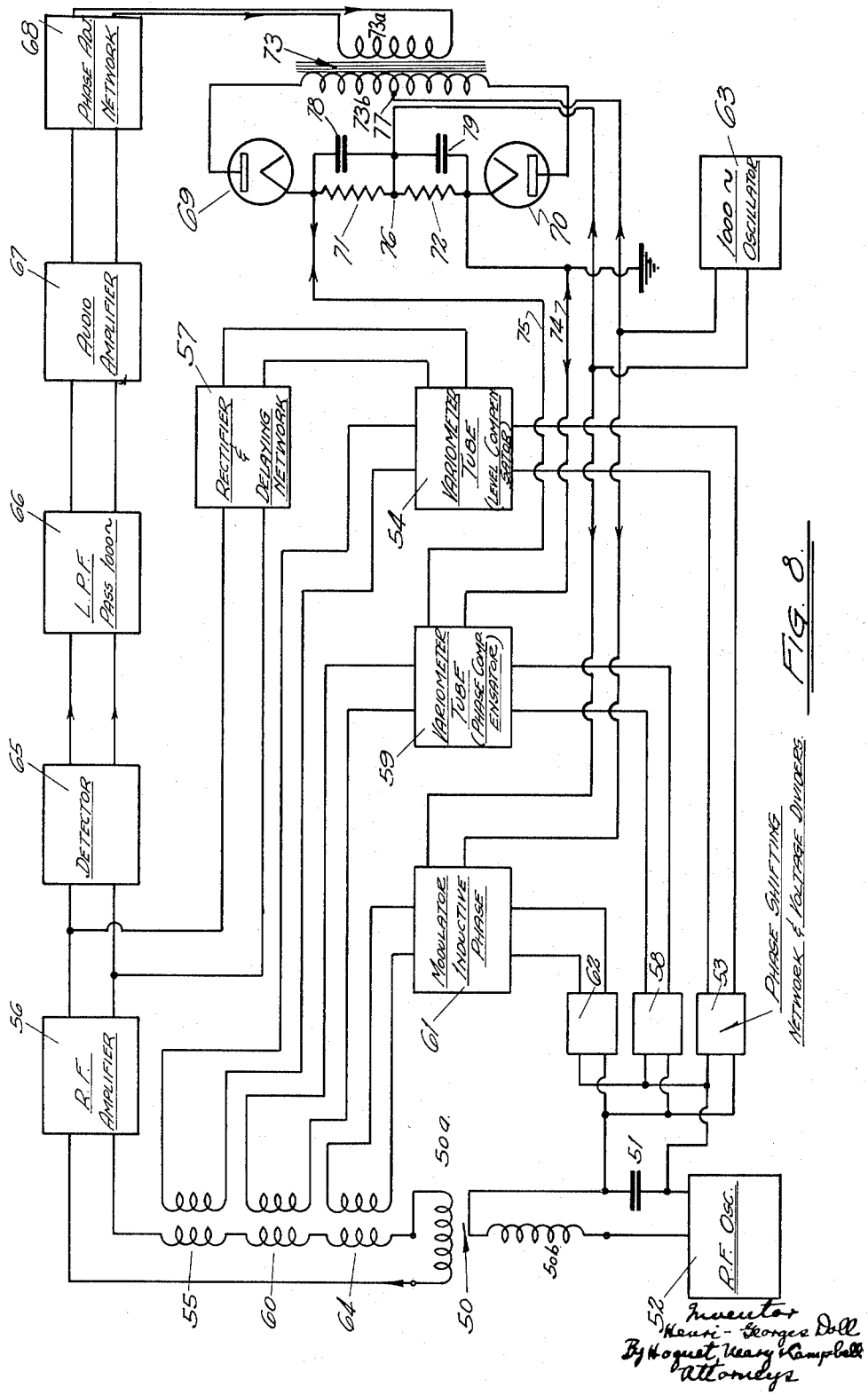
Figure 8 is a combination block and schematic diagram for an automatic network balance system which maintains constant both the phase and magnitude of signals provided by the system.

This invention also provides means for compensating for quadrature drift, the principle being indicated in Figures 6, 7, and 8.

Referring to Figure 8, the transmitter circuit including transmitter coil 50b and tuning condenser 51, is excited by an R.-F. oscillator 52. The E. M. F. appearing across condenser 51 is fed through a phase shifting network and voltage divider 53 to the control grid of a variometer tube 54. Tube 54 may, for example, produce a permanent resistive signal which is introduced into the receiver circuit by any conventional means such as transformer 55. The receiver circuit signal in the winding 50a is amplified by amplifier 56 and rectified by rectifier 57 which also includes the delaying network. The output of rectifier 57 is used to bias the tube 54, thus maintaining the magnitude of tthe permanent resistive signal constant in precisely the same manner and for the same purposes as explained in connection with Figures 4 and 5.

The E. M. F. appearing across condenser 51 is also fed through a phase shifting network and voltage divider 58 to a second variometer tube 59 which, with the aid of other circuit components, compensates for any quadrature signal, so its phase is adjusted so that it injects a purely inductive signal into the receiver circuit through a transformer 60. The bias on tube 59 is controlled in a different manner, however. To control the bias on tube 59, a third tube 61 and associated circuit is employed. The E. M. F. across condenser 51 is applied through a phase shifting network 62 to a grid of a tube 561, so a radio frequency potential appears in its plate circuit. The R.-F. potential is amplitude modulated at a much lower frequency, for example, by a 1000-cycle E. M. F. derived from a 1000-cycle oscillator 63. Tube 61 may, therefore, be referred to as a modulator tube. The modulator tube 61 introduces the 1000-cycle modulated R.-F. signal of inductive phase containing no resistive components through transformer 64 into the receiver circuit.

When the mutual impedance bridge is balanced, the receiver circuit signal may contain:

(a) A permanent R.-F. resistive signal produced by the electronic variometer tube 54;

(b) An inductive R.-F. signal produced by the variometer tube 59;

(c) A constant R.-F. inductive signal (carrier) produced by tube 61;

(d) Two R.-F. signals of inductive phase (sidebands)

also produced by tube 61 and spaced 1000 cycles per second (the frequency of the modulating signal) above and below the carrier frequency of signal (c).

The connections to transformers 60 and 64 are polarized so that in the receiver circuit the inductive R.-F. signal of (b) above is opposite in phase to the inductive R.-F. signal of (c) above.

Figure 6 shows graphically the composite signal appearing in the receiver circuit. In the case of Figure 6, (b) is equal and opposite to (c) inasmuch as the result is zero, there is no inductive signal from these two combined sources. The modulated output of modulator 61 is constant both in phase and magnitude. The phase of the output of tubes 54 and 59 is constant, but the magnitudes may change as the result of the automatically controlled D.-C. biases fed to their grids.

Figure 6 illustrates graphically the case where the permanent signal is purely resistive, that is, when there has been no drift in the inductive component. Figure 6, therefore, portrays the conditions when there is no need for compensation of the quadrature (in this case inductive) component. OA is the permanent resistive signal. $AB_1$, $AB_2$, $AB_3$, and $AB_4$ with maximum amplitude at $AB_2$ and $AB_4$ represent some of the inductive components successively applied during one modulating period to the receiver circuit by modulator tube 61, which is amplitude modulated at a 100-cycle rate, the center of the swing being at A. If the arc C—C' represents the cut-off level of the amplifier, then the R.-F. output at different intervals during an audio cycle may be represented as $C_0A$, $C_1B_1$, $C_2B_2$, $C_1B_1$, $C_0A$, $C_3B_3$, $C_4B_4$, $C_3B_3$, and back to $C_0A$. If these values are denoted by $X_0$, $X_1$, $X_2$, $X_1$, $X_0$, $X_3$, $X_4$, $X_3$, and $X_0$, then the radio frequency output may be represented by the area under the curve at the right. Inspection of this curve will reveal that during a single audio cycle, two maximums, $X_2$ and $X_4$, and two minimums, $X_0$, appear. In this case, $X_2=X_4$. The radio frequency signal in the receiver circuit is, therefore, modulated at 2000 cycles and higher harmonics. If in one branch of the receiver circuit, it is possible to separate the audio frequency from the R.-F., and if the audio signal is then fed through a filter which blocks frequencies of 2000 cycles and above, then there would be no output from this branch of the circuit for the conditions assumed in Figure 6. To accomplish this, the output of R.-F. amplifier 56 in Figure 8 is connected to a detector 65, the output of which is the audio signal. The output of detector 65 is connected to the input of a low-pass filter 66 which passes frequencies of 1000 cycles and below. The output of filter 66 would, therefore, be zero when the composite permanent signal is purely resistive as shown in Figure 6. This is the condition it is desired to maintain.

In order to see how this condition is maintained, it is necessary to consider the case where an inductive drift has occurred; that is, where the permanent signal contains a quadrature component. Such a situation is depicted in Figure 7. Referring to Figure 7, the permanent signal OA' has the same magnitude as OA in Figure 6, but it makes an angle with the OX or resistive axis. The audio modulation then produces a swing from $B_2'$ to $B_4'$ and the radio frequency signal in the receiver circuit during an audio cycle is shown by the curve on the right of Figure 7. $X_2'$ is no longer equal to $X_4'$ as was the case of the corresponding points on Figure 8A. The R.-F. output increases from the value $X_0'$ to a maximum $X_2'$ which is passed through only once on each complete audio cycle. The radio frequency output, therefore, contains an appreciable 1000-cycle modulation. It also contains a 2000-cycle modulation and higher harmonics as before. It should be noted at this point that the greater the drift in the inductive signal becomes, that is, the greater the angle between OA' and the OX axis, the greater becomes the proportion of 1000-cycle modulation in the output.

Accordingly, since the percentage of 1000-cycle modulation is directly related to the inductive drift, detecting the 1000-cycle modulation in the signal will furnish an indication of the relative magnitude of the inductive component. Further, the 1000-cycle modulation may be used to control the automatic compensation for the inductive component. This is what is accomplished by the circuit of Figure 8. The grid bias and, therefore, the gain of the inductive phase variometer tube 59 is controlled by the 1000-cycle modulation appearing in the output signal.

When an inductive component is present in the permanent signal, a corresponding amount of 1000-cycle energy is put out by filter 66. This 1000-cycle signal may be amplified by audio amplifier 67 and its phase adjusted if necessary by a phase adjustment network 68. The output of network 68 is connected to the primary $73a$ of an audio transformer. In order to control the grid bias of tube 59 by this 1000-cycle signal, it is necessary to change it to D.-C. Also, as the inductive drift may be in either direction, the relative polarity of the D.-C. must also be controlled; that is, the grid bias may have to be greater or smaller than standard. This will be better understood by again referring to Figure 7. While the point A' has been shown above the OX axis, the drift might have been such as to cause the point A' to lie below the OX axis. If the point A' is above the X axis, the 1000-cycle modulation of the total R. F. signal will have one phase relation with the audio oscillator 63. If the inductive drift is in the opposite direction, that is, if the point A' is below the X axis, the phase relationship between the 1000-cycle modulation of the total R. F. signal and the oscillator 63 will be changed 180°. Therefore, an indication of the relative phase of the 1000-cycle modulation of the R. F. signal will tell the direction of the drift. This phase relationship is utilized to control the direction of change at the grid bias on tube 59. The intensity of the 1000-cycle modulation of the total R. F. signal is utilized to control the amount of change of the grid bias.

It is, therefore, possible to provide a D.-C. bias which may be changed in both magnitude and direction with respect to the reference values. This is accomplished by the rectifiers 69 and 70 and associated elements as shown in Figure 8.

Two diode rectifiers 69 and 70 are connected in opposition, with resistances 71 and 72 between their cathodes, as shown. The two plates are connected together through the secondary $73b$ of the audio transformer 73. A 1000-cycle signal from oscillator 63 is fed to the common point of resistors 71 and 72 and the center tap of transformer secondary $73b$. The output 74, 75 is taken off the cathodes of the two diodes.

This portion of the circuit functions similarly to a wattmeter. There is no output on leads 74, 75 if the diode circuit is energized only by oscillator 63. Likewise, there is no output if the diode circuit is energized only by a 1000-cycle signal appearing in primary $73a$ of the transformer 73. When energized simultaneously by signals from both sources, any one of three conditions may result:

1. There may be no output.
2. The D.-C. output may become relatively more positive, increasing the bias on tube 59.
3. The D.-C. output may become relatively more negative, decreasing the bias on tube 59.

The degree of the change in output in steps 2 and 3 above, depends upon the amount of 1000-cycle modulation; that is, it is a function of the intensity of the 1000-cycle signal appearing in primary $73a$.

In order to better understand the operation of the diode circuit, let it first be assumed that the signal is derived only from oscillator 63 (hereinafter referred to as the oscillator signal); secondly, that the signal is derived only from the bridge drift and is the signal appearing in primary 73a (hereinafter referred to as the drift signal); and third, that both an oscillator signal and a drift signal are applied simultaneously. The third case is the one corresponding to actual operation of the equipment.

When only an oscillator signal is applied to the diode circuit, the circuit constitutes a balanced circuit or bridge as the signal encounters an identical circuit whether it follows the top loop including diode 69, or the bottom loop including diode 70. Suppose at one instant of time the point 77 is positive. The plates of both diodes are then positive and both diodes are conductive. A current then flows in both resistors 71 and 72, these currents being equal and opposite. Each may be +10 volts for example. If resistors 71 and 72 are shunted by large enough condensers 78 and 79 respectively, then leads 74 and 75 are maintained at their peak positive potential, which may be assumed +10 volts. During the other half cycle, the point 77 is negative, so both plates are negative, so both diodes are nonconductive. Condensers 78 and 79 maintain the output potential during this half cycle. As the grid bias applied to tube 59 is the difference in potential between leads 74 and 75, there is no output; that is, there is no grid bias applied, when only an oscillator signal is applied to the diode circuit.

When the second condition obtains and only a drift signal is applied to the diode circuit, one diode or the other is conductive depending upon polarity of the E. M. F. induced in secondary 73b. If at one instant the plate of diode 69 is positive, then the plate of diode 70 is negative. Diode 69 is then conductive causing current to flow through resistor 71 and charging condenser 78. The circuit is completed through the low impedance of oscillator 63. At this instant, lead 75 becomes positive with respect to the reference point 76; it may be +6 volts, for example. During the opposite half cycle, diode 70 conducts, causing current to flow through resistor 72 and charging condenser 79 to the peak potential. A positive potential, therefore, appears on lead 74. This potential is equal to the potential previously applied to lead 75. Although diode 69 is nonconductive, the positive potential on lead 75 has been maintained by condenser 78. Accordingly, over a period of one cycle or more, both leads 74 and 75 are positive and their potentials are equal. Therefore, the action of a drift signal alone does not change the grid bias applied to tube 59.

In operation, the oscillator signal is continuously applied to the diode circuit. A drift signal may or may not be applied to the circuit, depending upon whether or not a drift of the inductive phase has occurred in the detector unit. If there is no drift, then obviously there is no need to correct for one. If a drift has occurred, a 1000-cycle signal will appear in primary 73a, as previously explained. The relative phase of this 1000-cycle signal with respect to the 1000-cycle modulation of the modulator tube will depend upon the direction of drift.

For the sake of explanation, let it be assumed that at one instant of time the potential of the point 77 is positive due to the oscillator signal. At the same time the drift signal is such that it tends to make the plate of diode 69 positive and the plate of diode 70 negative. The plate of diode 69 is, therefore, made positive by two additive sources, so the potential of lead 75 may be +14 volts. Also at this same time, two potentials are being applied to the plate of diode 70; the potential due to the oscillator signal is positive and the potential due to the drift signal is negative. The instantaneous difference between the two is then the plate potential with the result that diode 70 passes less current and the potential of lead 74 will be less than +10 volts; it may be +6 volts. Lead 75 is then 8 volts positive with respect to lead 74, so the grid bias on tube 59 is changed by 8 volts. When the bias on tube 59 becomes more positive, it passes more current, so it injects an inductive component signal through transformer 60 into the composite signal.

Inasmuch as this drift represents an unwanted signal, there is no need to delay the action of the automatic balance. If for some reason, it would be desired to delay the compensation for quadrature (in this case, inductive) drift, it would only be necessary to insert a delaying network between the diode circuit and the tube 59.

To complete the operational analysis set forth above, if the drift at that same instant of time had been in the other direction, then the phase of the drift signal would have been 180° different, as was explained in connection with Figure 7. Then under these circumstances, when the point 77 was positive due to the oscillator signal, the E. M. F. induced in secondary 73b due to the drift signal would have been such as to tend to make the plate of diode 69 negative, and the plate of diode 70 positive. Diode 70 would then have drawn more current and diode 69 less current, with the result that lead 74 would have been positive with respect to lead 75, thereby just reversing the action. If the same values are taken as before, then lead 75 is +8 and lead 74 is +14 volts. The grid bias on tube 59 is reduced, reducing the quadrature component signal produced by tube 59.

An instrument may be provided, if desired, for indicating and/or recording the grid bias supplied through the leads 74, 75 to denote the amount of induction component that is compensated (which might be due to magnetic ground, drift due to thermal expansion or metal).

The above described system is useful for detecting nonmetallic mines in conductive ground. However, for the detection of metallic mines or other metallic objects, the oscillator 52 may provide a signal of lower frequency, for example, 1000-cycles and modulation frequency may be substantially lower than that, for example, between 10 and 50 cycles.

It is believed evident from the foregoing how the status of any part or parts of any network may be maintained, and how an indication may be obtained of the changes that would have occurred had the automatic balancing features not been present.

While representative embodiments of the invention have been described in detail hereinabove, the invention is not intended to be restricted thereto, as those embodiments are susceptible of numerous changes in form and detail. For instance, the control tubes have been described as pentodes. Triodes or other tubes could be used just as well. Several tubes may be used in place of each one shown. Also control has been achieved by varying the D.-C. bias on the control tubes, but the varying D.-C. may be used to control the amplifier gain if desired. The means shown for impressing a signal on the circuits are conventional and any other suitable means may be used. For instance, transformers 55, 60, and 64 in Figure 8 have been shown separately for the sake of clarity. A common transformer may be used; in fact, no transformer is necessary as winding 50a may serve as an autotransformer. The frequencies cited are only typical; the higher frequencies work better when detecting nonmetallics, and lower frequencies are preferable when searching for metallic objects. Preferably a frequency is selected that will cause metallic mine signals to have both inductive and resistive components.

When it is desired to change the phase derived from a tube, it may be done by changing the phase of its excitation (control grid) or the phase shift in the coupling from its plate to the receiver circuit, as is well known in the electronics art.

Therefore, the above described embodiments of the invention should be considered illustrative and not as limiting the scope of the following claims.

I claim:

1. An electromagnetic testing device comprising first and second vario-couplers each having a primary and a secondary winding, a pair of input terminals associated with said vario-couplers and adapted to be connected to a source of alternating voltage, means for connecting an impedance in circuit with the primary winding of said first vario-coupler across said input terminals, a phase-shifting circuit in parallel with said input terminals and including (1) the primary winding of said second vario-coupler and (2) means for shifting the phase of a current in said phase-shifting circuit with respect to the current in the primary winding of said first vario-coupler, a series-connected detector circuit including (1) the secondary windings of said vario-couplers and (2) means for detecting current flow in said secondary circuit, and means for supplying to said detector circuit a voltage determined by said impedance.

2. An electromagnetic testing device comprising first and second vario-couplers each having a primary and a secondary winding, a pair of input terminals associated with said vario-couplers and adapted to be connected to a source of alternating voltage, an auxiliary primary winding adapted to be disposed in inductive relation to a medium to be tested and being connected in series with the primary winding of said first vario-coupler, an auxiliary secondary winding adapted to be disposed in inductive relation to said medium to be tested, a phase-shifting circuit in parallel with said input terminals including (1) the primary winding of said second vario-coupler and (2) means for shifting the phase of a current in said phase-shifting circuit with respect to the current in the primary winding of said first vario-coupler, and a series-connected detector circuit including (1) the secondary windings of said vario-couplers, (2) said auxiliary secondary winding, and (3) means for detecting current flow in said secondary circuit.

3. A method of detecting an object in a medium of different electrical conductivity therefrom, comprising moving relatively to said medium a coil system energized by alternating current to subject said object and medium to an alternating magnetic field, moving with said coil system another coil system disposed for inductive coupling therewith and zero mutual inductance in a homogeneous medium to induce in said another coil system a signal that may have in phase and quadrature phase components with respect to said alternating current when said field is unsymmetrical with respect to said another coil system, modifying said signal by combination therewith of a reference signal having the same phase as one of said signal components and of sufficient magnitude to form with any in phase and quadrature phase components of said signal a resultant signal that is relatively unaffected by variations in the magnitude of the other of said components, varying the magnitude of said reference signal in accordance with variations in the magnitude of said resultant signal to maintain said resultant signal substantially at a predetermined level, and obtaining indications of variations in the magnitude of at least one of two signals including said resultant signal and said other component.

4. A method as defined in claim 3 in which said reference signal is in phase with said alternating current.

5. A method as defined in claim 3 in which the phase of said reference signal is in quadrature with said alternating current.

6. In an alternating current network, the combination of a transmitter having an oscillator and a first coil system energized with alternating current thereby; a receiver having another coil system positioned adjacent to said first coil system for inductive coupling therewith and an amplifier connected to receive signals from said another coil system and providing an output; means including an electronic variometer for introducing into said another coil system a current component of a predetermined phase with respect to said alternating current; and means responsive to variations in the output of said amplifier representing signals of given phase in said another coil system for varying the magnitude of said current component supplied by said variometer to restore amplifier output signals of given phase substantially to a predetermined level.

7. In an alternating current network, the combination of a transmitter having an oscillator and a first coil system energized by alternating current from said oscillator; a receiver having a second coil system positioned adjacent said first coil system for inductive coupling therewith, an amplifier connected to receive the output of said second coil system and providing an output responsive to signals induced in said second coil system, and an indicator responsive to the output of said amplifier; and an electronic variometer connected to supply to said second coil system a current component of a predetermined phase with respect to said alternating current, said variometer including a variable gain electronic tube having a control electrode whose bias determines the amplitude of said component, and a source of bias connected to said control electrode, said bias source being responsive to signals in the output of said amplifier representing signals of said predetermined phase in said second coil system.

8. An alternating current network as defined in claim 7 in which the electronic variometer is connected to supply to the second coil system a current component of inductive phase with respect to said alternating current and the bias source is responsive to signals in the output of the amplifier representing signals of inductive phase in said second coil system.

9. An alternating current network as defined in claim 7 in which the electronic variometer is connected to supply to the second coil system a current component of resistive phase with respect to said alternating current and the bias source is responsive to signals in the output of the amplifier representing signals of resistive phase in said second coil system.

10. In an alternating current network, the combination of a transmitter having an oscillator and a first coil system energized by alternating current from said oscillator; a receiver having a second coil system positioned adjacent to said first coil system for inductive coupling therewith, an amplifier connected to receive signals from said second coil system and an indicator responsive to the output of said amplifier; means connected to supply to said receiver a current component of a predetermined phase with respect to said alternating current and of a predetermined magnitude to maintain amplifier output signals of given phase at a predetermined level; and means responsive to variation in the output of said amplifier for automatically but with delayed action varying the magnitude of said current component to restore said output signals of given phase to substantially said predetermined level.

11. In an alternating current network, the combination of a transmitter having an oscillator and a first coil system energized with alternating current from said oscillator to create an alternating current field in a surrounding medium; a receiver having another coil system positioned adjacent said coil system for inductive coupling therewith, an amplifier connected to receive the output of said another coil system for amplifying potentials induced therein by said alternating current field, and an indicator responsive to the output of said amplifier, means including an electronic variometer responsive to a control potential for introducing into said another coil system a current component of a predetermined phase with respect to said alternating current and of relatively large magnitude as compared with signals of different phase in said another coil system, and delayed action means responsive to signals in the output of said amplifier representative of signals of said predetermined phase in said another coil system for varying the control potential applied to said variometer to vary the magnitude of said component and restore amplifier output signals of said predetermined phase substantially to a predetermined level.

12. An alternating current network as defined in claim 11 in which the electronic variometer introduces into said another coil system a current component of resistive phase with respect to said alternating current and of relatively large magnitude as compared with signals of inductive phase with respect to said alternating current in said another coil system, whereby amplifier output signals representing resistive signals induced in said another coil system are maintained substantially at a predetermined level.

13. An alternating current network as defined in claim 11 in which the electronic variometer introduces into said another coil system a current component of inductive phase with respect to said alternating current and of relatively large magnitude as compared with signals in said another coil system that are of resistive phase with respect to said alternating current, whereby amplifier output signals representing inductive signals induced in said another coil system are maintained substantially at a predetermined level.

14. In an alternating current network the combination of a transmitter having an oscillator and a first coil energized with alternating current by said oscillator; a receiver having a second coil disposed adjacent to said first coil for inductive coupling therewith, an amplifier connected to receive signals from said second coil providing an output responsive to currents induced in said second coil, means for supplying to said receiver a current component of a predetermined phase with respect to said alternating current and magnitude to maintain amplifier output signals of said predetermined phase at a predetermined level and to render said receiver selective to other currents induced in said second coil of a phase the same as or opposite to said current component, an indicator electrically connected to said amplifier, and means for controlling the indicator for operation to indicate only the variations in the value of the induced currents.

15. In a method of operating an alternating current network having transmitter and receiver coil systems disposed for inductive coupling therebetween, the steps of energizing said transmitter coil system with alternating current, initially balancing said network to produce reference output conditions in said receiver coil system, disposing said coil systems in proximity to a medium to be explored so that any modification of the mutual inductance between said coil systems resulting therefrom will cause a signal to be induced in said receiver coil system, modifying said induced signal by addition thereto of a component signal of a selected phase with respect to said alternating current and of much amplitude relative to said induced signal, and varying the amplitude of said component signal in accordance with the average amplitude of the resultant of said induced and component signals to maintain the average amplitude of said resultant signal substantially constant.

16. In a method of operating an alternating current network having transmitter and receiver coil systems disposed for inductive coupling therebetween, the steps of energizing said transmitter coil system with alternating current, initially balancing said network to produce reference output conditions in said receiver coil system, disposing said coil systems in proximity to a medium to be explored so that any modification of the mutual inductance between said coil systems resulting therefrom will cause a signal to be induced in said receiver coil system, modifying said induced signal by addition thereto of a component signal of resistive phase with respect to said alternating current and large amplitude relative to said induced signal, and varying the amplitude of said component signal in accordance with the average amplitude of the resultant of said induced and component signals to maintain the average amplitude of said resultant signal substantially constant.

17. In a method of operating an alternating current network having transmitter and receiver coil systems disposed for inductive coupling therebetween, the steps of energizing said transmitter coil system with alternating current, initially balancing said network to produce reference output conditions in said receiver coil system, disposing said coil systems in proximity to a medium to be explored so that any modification of the mutual inductance between said coil systems resulting therefrom will cause a signal to be induced in said receiver coil system, modifying said induced signal by addition thereto of a component signal of inductive phase with respect to said alternating current and large amplitude relative to said induced signal, and varying the amplitude of said component signal in accordance with the average amplitude of the resultant of said induced and component signals to maintain the average amplitude of said resultant signal substantially constant.

References Cited in the file of this patent

UNITED STATES PATENTS

| Number | Name | Date |
|---|---|---|
| 1,812,392 | Zuschlag | June 30, 1931 |
| 1,897,634 | De Forest | Feb. 14, 1933 |
| 2,046,436 | Waschek | July 7, 1936 |
| 2,082,997 | Zuschlag | June 8, 1937 |
| 2,117,390 | Zuschlag | May 17, 1938 |
| 2,144,476 | Zuschlag | Jan. 17, 1939 |
| 2,160,356 | Fore et al. | May 30, 1939 |
| 2,217,843 | Langer | Oct. 15, 1940 |
| 2,220,070 | Aiken | Nov. 5, 1940 |
| 2,225,653 | Monk | Dec. 24, 1940 |
| 2,290,330 | Irwin | July 21, 1942 |
| 2,321,355 | Berman | June 8, 1943 |
| 2,321,356 | Berman | June 8, 1943 |
| 2,358,441 | Bowsky | Sept. 19, 1944 |
| 2,377,500 | Johnson | June 5, 1945 |
| 2,415,789 | Farrow | Feb. 11, 1947 |
| 2,437,455 | Berman | Mar. 9, 1948 |
| 2,446,527 | Chun | Aug. 10, 1948 |
| 2,483,718 | Aiken | Oct. 4, 1949 |
| 2,489,920 | Michel | Nov. 29, 1949 |
| 2,502,626 | Mages | Apr. 4, 1950 |
| 2,569,691 | Roberts | Oct. 2, 1951 |
| 2,608,602 | Muffly | Aug. 26, 1952 |